Jan. 27, 1948.  E. L. PRESSLEY  2,435,054
POWER CHECK PLANTER
Filed July 27, 1945  2 Sheets-Sheet 1
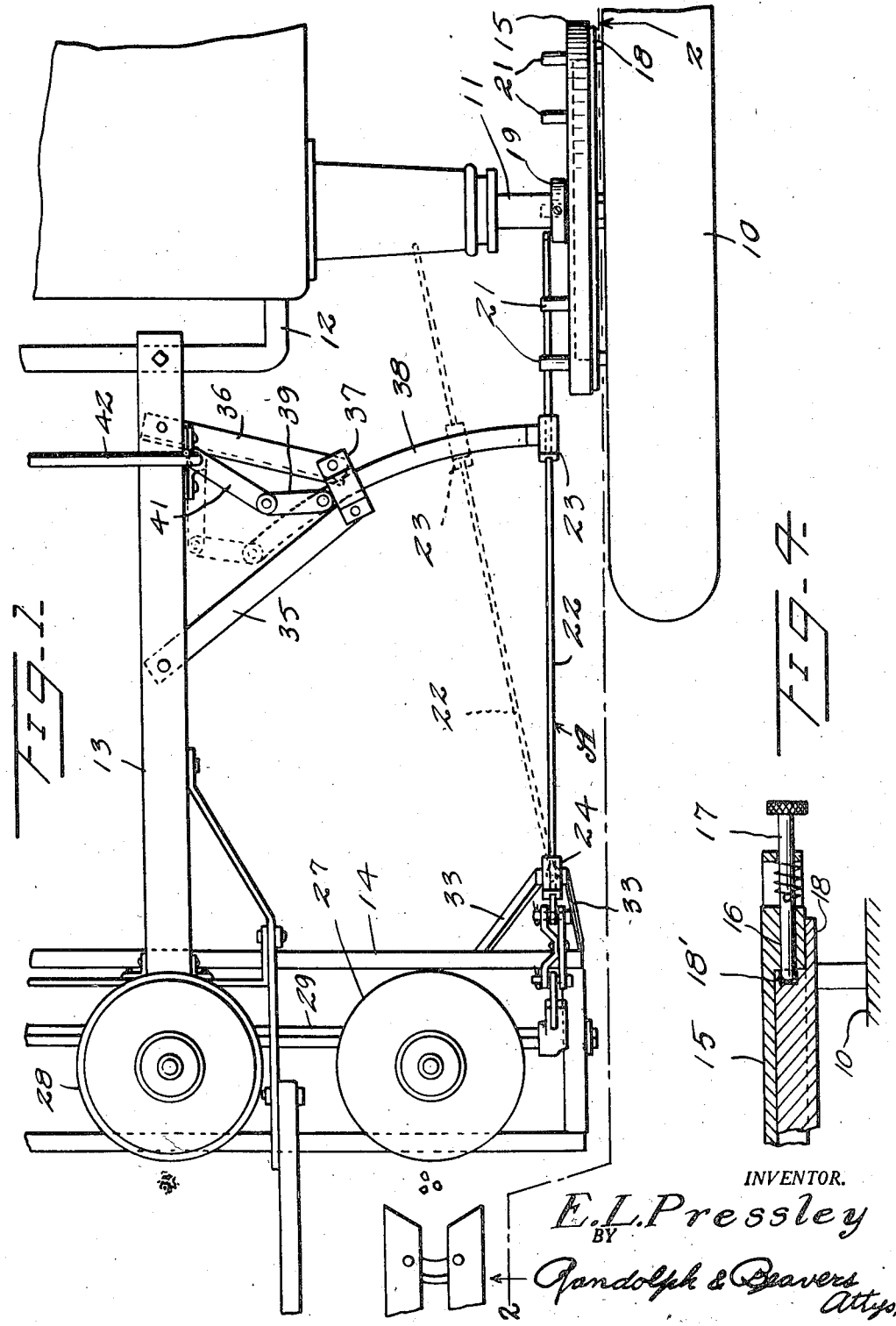
INVENTOR.
E. L. Pressley
BY
Randolph & Beavers
Attys.

Jan. 27, 1948. E. L. PRESSLEY 2,435,054
POWER CHECK PLANTER
Filed July 27, 1945 2 Sheets-Sheet 2
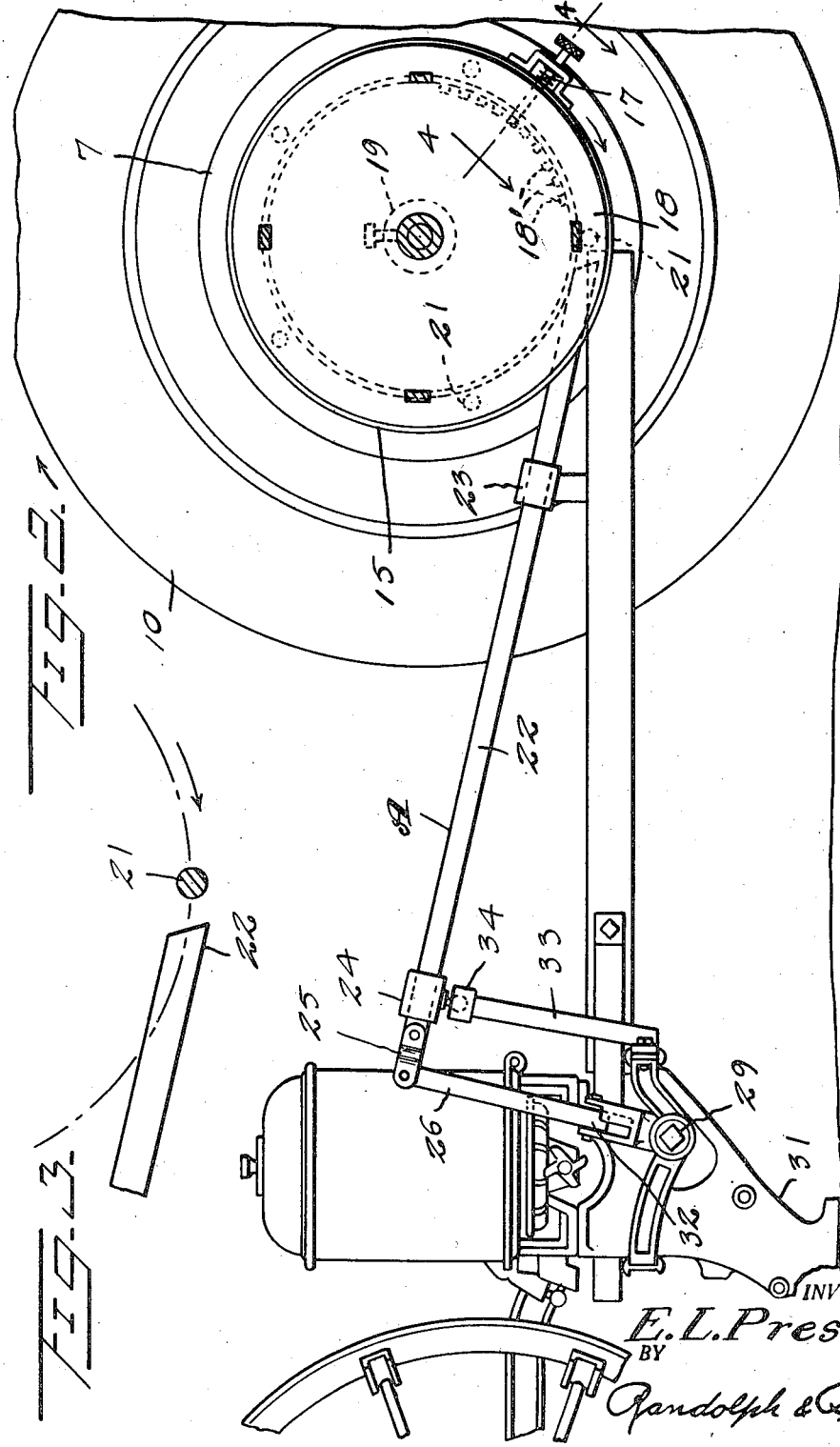
INVENTOR.
E. L. Pressley
BY
Randolph & Beavers
Attys.

Patented Jan. 27, 1948

2,435,054

UNITED STATES PATENT OFFICE 2,435,054

POWER CHECK PLANTER

Everett L. Pressley, Aledo, Ill.

Application July 27, 1945, Serial No. 607,311

2 Claims. (Cl. 111—16)

This invention relates generally to seed planters. More specifically, the invention relates to a power check mechanism for a seed planter adapted to be operated automatically from a suitable draft device such, for example, as a tractor.

It is an object of the present invention to provide a seeder which operates automatically to drop seed at intervals as the seeder is drawn over the ground.

Another object is the provision of a power check for a seed planter which automatically operates to drop seed at regular intervals and which is adjustable in order that the planted rows will be aligned both longitudinally and transversely.

A further object is to provide a seed planter of the aforedescribed character which will be rendered inoperative during the interval required for turning from a seeded row to an unseeded row.

Additional objects and advantages of the present invention are those residing in and relating to the novel construction and arrangement of the parts thereof as will more clearly appear as the description proceeds, reference being had to the accompanying drawings of which:

Figure 1 is a top plan view of the seeder of the present invention according to the preferred embodiment thereof;

Figure 2 is a side elevation of the seeder;

Figure 3 is a detailed view of a portion of the check mechanism, and

Figure 4 is a sectional view taken substantially along the line 4—4 of Figure 2.

Referring now to the drawings for a clearer understanding of the invention, there is shown thereon a portion of a suitable draft device such, for example, as a tractor. The numeral 10 designates a tractor wheel journaled to axle 11. Secured to the draft bar 12 of the tractor is a draw bar 13 which in turn is secured to a portable seeder frame indicated generally by the numeral 14.

An adjustable, circular steel plate 15 having a hole 16 cut radially therein is disposed about the axle 11 and is maintained in an adjusted position with respect to the tractor wheel 10 by a spring pin 17 adapted to fit selectively into recesses 18'. Disposed intermediate the wheel 10 and plate 15 and secured to the wheel is a base plate 18 in a peripheral portion of which is formed the circumferentially spaced recesses 18' which permit adjustment of plate 15, a collar 19 being fixed to axle 11 in order to maintain the plate 15 in a predetermined position on the axle.

Circumferentially mounted on the circular plate 15 and arranged in predetermined spaced relation thereon are a plurality of steel pins 21 adapted successively to engage an inclined, sliding rod 22 as the wheel 10 rotates. Rod 22 slides through a straight type bearing 23 and a swivel ball and socket type bearing 24 and is connected at the rear end thereof to one end of a connecting joint 25, the other end of the connecting joint being secured to a vertically inclined arm 26.

Arranged on the seeder framework 14 in any suitable manner are conventional lime and seed hoppers 27 and 28 adapted to drop lime and seed through valves 31 when the square shaft 29 extending longitudinally of the frame 14 is rotated in a counter-clockwise direction, the shaft 29 being rotatably secured to the seeder framework 14 in any suitable manner. The lower end of the vertically inclined arm 26 is pivoted to a knee joint 32 and operatively secured to the square shaft 29. Bracing arms 33 extend from the seeder frame and support a ball socket bearing 34.

Affixed to the draw bar 13 are two angle irons 35 and 36 which support a slide bearing 37 through which extends a curved shaft 38, one end of the shaft being fixed to the rod 22 through bearing 23. The other end of shaft 38 is pivotally secured to a connecting link 39, which link in turn is pivotally secured to a link member 41 rotatable by motion of a lever 42 operatively secured thereto.

In operation, the rod 22 is urged rearwardly as the pins 21 momentarily move into engagement therewith. As rod 22 moves rearwardly, motion is transmitted through connecting joint 25 to the vertically inclined arm 26 thereby causing the square shaft to rotate in a counter-clockwise direction and initiate the operation of the respective lime and seed hopper mechanisms to drop lime and seed through valves 31. The purpose, of course, for the lime hopper is to mark the position of the seed check for future reference. Any suitable means (not shown) may be employed for restoring the square shaft to its initial position and the rod into operative relation with the pins 21, such means may take the form of resilient biasing means for the shaft.

In order to prevent the pins from engaging rod 22 while the tractor is turning, lever 42 is operated to place the rod in an inoperative position with respect to the tractor wheel and pins, such position being shown in dashed outline in Figure 1. It will be understood of course that movement of rod 22 into the aforesaid inoperative position is possible by the provision of the ball socket bearings 24 and 34, the arm 28 being movable in one direction through the knee joint 32.

As mentioned heretofore, the circular plate 15 carrying the pins 21 is rotatable by removing the spring pin 17 from engagement with one of the recesses 18'. Such a condition is desirable in order to align the checks in each row to be seeded. By selecting one of the recesses 18' to receive the pin 17, the instant position of rod 22 with respect to the next engaging pin may be varied whereby the position of the first check in any one row is controlled.

From the foregoing it should now be apparent that a power check for a seed planting device has been provided which is well adapted to fulfill the aforesaid objects of the invention.

While the invention has been described with particularity in reference to an example thereof which gives satisfactory results, it readily will be apparent to those skilled in the art to which the invention pertains, after understanding the invention, that further embodiments, modifications and changes may be made therein without departing from the spirit and scope thereof as defined by the claims appended hereto.

What is claimed as new and desired to be secured by Letters Patent of the United States is:

1. The combination with a tractor, a plurality of pins circumferentially arranged on one of the tractor wheels and rotatable therewith, a portable framework secured to said tractor, a slidable rod mounted on said framework and having a longitudinal axis disposed in the plane of rotation of said pins, said rod being adapted to be engaged successively by each of the pins and to be moved rearwardly thereby as the tractor wheel rotates, a seed hopper supported on said framework, a pivotally mounted shaft for operating said hopper, means interconnecting said rod and said shaft for rotating the shaft when the rod is moved rearwardly, and means for moving said rod out of operative relation with said pins thereby displacing said longitudinal axis of the rod from the axis of rotation of said pins.

2. The combination with a tractor, a plurality of pins circumferentially arranged in predetermined spaced relation on one of the tractor wheels and rotatable therewith, a portable framework secured to said tractor, a slidable rod mounted on said framework in operative relation with said pins and having a longitudinal axis disposed in the axis of rotation thereof, said rod being adapted to be engaged successively by each of said pins and to be moved rearwardly thereby as the tractor wheel rotates, a seed hopper supported on said framework, a pivotally mounted shaft for operating said hopper, means interconnecting said rod and shaft for rotating the shaft each time the rod is moved rearwardly, means for moving said rod out of operative relation with said pins thereby displacing the longitudinal axis of the rod from the axis of rotation of said pins, and means for varying the instant position of said pins with respect to said rod.

EVERETT L. PRESSLEY.

REFERENCES CITED

The following references are of record in the file of this patent:

UNITED STATES PATENTS

| Number | Name | Date |
|---|---|---|
| 636,659 | Grim | Nov. 7, 1899 |
| 1,062,787 | Moore | May 27, 1913 |
| 1,073,816 | Parker et al. | Sept. 23, 1913 |
| 1,152,033 | Matheny | Aug. 31, 1915 |